United States Patent [19]

Tanaka

[11] Patent Number: 5,793,375
[45] Date of Patent: Aug. 11, 1998

[54] IMAGE PROCESSING APPARATUS FOR FORMING A SURFACE DISPLAY IMAGE

[75] Inventor: Yuko Tanaka, Tochigi-ken, Japan

[73] Assignee: Kabushiki Kaisha Toshiba, Kawasaki, Japan

[21] Appl. No.: 555,078

[22] Filed: Nov. 8, 1995

[30] Foreign Application Priority Data

Nov. 9, 1994 [JP] Japan .................... 6-274950

[51] Int. Cl.$^6$ .................................. G06T 15/50
[52] U.S. Cl. .................................. 345/426; 345/424
[58] Field of Search .................... 395/119–20, 122, 395/124, 131–2, 24, 126; 364/413.13, 413.14, 413.17, 413.22; 345/419.2, 422–424, 431–32, 426, 429; 128/653.1, 653.2

[56] References Cited

U.S. PATENT DOCUMENTS

| 4,879,652 | 11/1989 | Norwak | 364/413.18 |
| 4,879,668 | 11/1989 | Cline et al. | 395/124 |
| 4,985,834 | 1/1991 | Cline et al. | 364/413.22 |
| 5,063,375 | 11/1991 | Lien et al. | 345/426 |
| 5,280,344 | 1/1994 | Witlin et al. | 348/708 |
| 5,368,033 | 11/1994 | Moshfeghi | 600/419 |

OTHER PUBLICATIONS

Bomans, M., et al, "3–D Segmentation of MR Images of the Head for 3–D Display", *IEEE Transactions on Medical Imaging*, vol. 9, No. 2, pp. 177–183, Jun. 1990.

Foley, James D., et al, "Computer Graphics: Principles and Practices", *Addison–Wesley Publishing Co.*, 2nd ed., pp. 730–741, 1990, (hereinafter Foley).

Tiede, et al. "Surface Rendering: Investigation of Medical 3D–Rendering Algorithms", *IEEE Computer Graphics & Applications* Mar. 1990, 41–53.

*Primary Examiner*—Rudolph J. Buchel, Jr.
*Attorney, Agent, or Firm*—Oblon, Spivak, McClelland, Maier & Neustadt, P.C.

[57] ABSTRACT

An image processing apparatus for forming a high-quality surface display image at high speed is provided. From raw data input by a medical image diagnosis apparatus, gray-level volume data and binary volume data in which a region-of-interest is extracted by binarizing are obtained. The binary volume data is subjected to ray-casting and projected onto a screen. A depth image formed of pixels on the screen and a distance between the screen and the surface (surface voxel) of a display object is obtained. The coordinates of the surface voxels are calculated from the depth image. Surface normals are obtained from voxel values of the gray-level volume data and a voxel values in the vicinity, and a shaded image is formed on the basis of surface normals.

17 Claims, 4 Drawing Sheets

FIG. 10 he present invention has been made in consideration of
IMAGE PROCESSING APPARATUS FOR FORMING A SURFACE DISPLAY IMAGE

BACKGROUND OF THE INVENTION

1. Field of the Invention

The present invention relates generally to an image processing apparatus for forming a three-dimensional (3D) image showing an object stereoscopically from volume data, and more particularly to an image processing apparatus for forming a surface display image for medical use.

2. Description of the Related Art

In the prior art, medical image data is obtained by various image diagnosis apparatuses such as a computed tomography apparatus (CT), a magnetic resonance imaging apparatus (MRI), a nuclear medicine diagnosis apparatus including a positron emission CT apparatus (PET) and a single photon emission CT apparatus (SPECT), an diagnostic ultrasound apparatus and an diagnostic X-ray apparatus.

The obtained medical image data (raw data) is subject to various image processing, in order to obtain diagnostically and medically useful information which is offered to doctors.

For example, bones, organs, etc. are extracted from 3D image information of the human body, and 3D images showing them stereoscopically are prepared. Recently, such 3D images have been displayed in clinical medicine for the purpose of diagnosis and medical treatment.

In the medical field, the 3D images to be displayed are produced mainly by two methods. In one of the two methods, an object (organ, etc.) to display is extracted from volume data, and on the basis of the data of the extracted object a three-dimensional surface image (hereinafter referred to as "surface display image") is produced. In the other method, the voxel value of each voxel (equivalent to pixels of a two-dimensional image) of the volume data is used as it is, and the voxel value is projected onto a two-dimensional screen (projection plane), as represented by an MIP method (e.g. a maximum value projection method, a minimum value projection method).

The present invention relates to the former method of forming the surface display image. The process of forming the surface display image comprises two stages: modeling and rendering. In the modeling stage, data of intermediate slices is interpolated from raw data of the original slices, which is a mass of two-dimensional tomograms obtained by a medical image diagnosis apparatus, and volume data is prepared. Then, an object for surface display is extracted as a region-of-interest (ROI) from the volume data.

In the rendering stage, the volume data of the ROI is subjected to a projection process for projection onto a two-dimensional screen in the viewing direction (i.e. direction of display). Then, the resultant data is subjected to a shading process for representing a 3D shape of the projected ROI. Thus, the surface display image is formed.

The image quality and the speed of formation of the surface display image depend on the methods of the modeling and rendering. For example, Tiede et al., "Surface Rendering: Investigation of Medical 3D-Rendering Algorithms", IEEE Computer Graphics & Applications, March 1990, 41–53, discloses a Z-buffer gradient shading method as an example of a method for forming a surface display image with priority given to the image formation speed over the image quality. In this method, at first, in the modeling step, volume data of gray-level data format is prepared. Then, this volume data is converted into volume data of binary data format, in which "1" is assigned to the voxel value of an ROI to be visualized and "0" is assigned to the voxel value of the other region. In the subsequent rendering step, the volume data of binary data format is subjected to a process such as ray-casting and a hidden surface is erased. Thus, a depth image (Z-buffer) representing a distance between the point of view and the surface of the display object is produced. From the depth image, a normal line perpendicular to the object surface is calculated, and a shading process is performed based on the normal lines.

In this method, since the volume data to be treated is of the binary data format, it is sufficient to assign only one bit to one voxel. Accordingly, the total capacity of volume data of binary data format may be only 16 MB if the matrix size (number of pixels) is $512^3$. Since this capacity is less than the total capacity of gray-level volume data prior to conversion to binary volume data, the image formation process can be performed at higher speed than in a gray-level gradient shading method using gray-level values of the gray-level volume data. In addition, the processing of drilling, cutting, etc. for volume data is necessary when surface display images are used in so-called computer-simulated surgery, which is one of applications in clinical medicine. This processing can be performed at high speed.

However, since the image is formed on the basis of the volume data of binary data format, the quality of surface display image is not so high that detailed observation can be performed, as compared to the case where the image is formed on the basis of gray-level volume data.

The aforementioned reference also discloses a gray-level gradient shading method as an example of forming a surface display image with priority given to the image quality over the image formation speed. In this method, at first, in the modeling step, volume data of gray-level data format is prepared. It is to be noted that the volume data of gray-level data format is not converted into the volume data of binary data format and the volume data of gray-level data format is used as it is in the gray-level gradient shading method.

In the subsequent rendering step, on the basis of the gray-level volume data, an object surface is detected and a hidden surface is erased by using a method such as ray-casting. A normal line to the object surface is calculated on the basis of the detected voxel values of the object surface and voxel values of the vicinity, and a shading process is performed.

In this method, a more exact normal line of the object surface can be obtained on the basis of gray-level information of voxels. Thus, the quality of the formed surface display image is higher.

However, since the volume data to be processed is gray-level data, about two bytes (16 bits) need to be assigned to one voxel. Consequently, the total capacity of the gray-level volume data is as large as 256 MB if the matrix size is $512^3$. This capacity is greater than the total capacity of the aforementioned volume data of binary data format. Therefore, the image forming process is time-consuming.

SUMMARY OF THE INVENTION

The present invention has been made in consideration of the above circumstances and its object is to provide an image processing apparatus for forming a high-quality surface display image at high speed.

According to one aspect of the invention, there is provided an image processing apparatus comprising:

conversion means for converting a three-dimensional gray-level image to a three-dimensional binary image in which a region-of-interest has a first value and a region other than the region-of-interest has a second value;

projection means for projecting the region-of-interest of the three-dimensional binary image obtained by the conversion means on a screen to obtain a depth image; and first formation means for forming a first surface display image by performing shading process on the basis of the depth image and three-dimensional gray-level image.

According to another aspect of the invention, there is provided an image processing method comprising:

converting a three-dimensional gray-level image to a three-dimensional binary image in which a region-of-interest has a first value and a region other than the region-of-interest has a second value;

designating a display direction of the surface display image to determine an optimum display direction;

projecting a region-of-interest of the binary image on a screen in the display direction designated by the designating step to obtain a depth image indicative of a distance between the screen and the region-of-interest;

forming a first surface display image by performing shading process on the basis of the depth image;

displaying the first surface display image; and determining whether or not the optimum display direction is determined, executing the designating step again if the optimum display direction has not been determined, and if the optimum display direction has been determined, forming a second surface display image by performing shading process on the basis of the gray-level image and displaying the second surface image.

According to the image processing apparatus of the present invention, a three-dimensional gray-level image with gray-level values is converted to a three-dimensional binary image in which a region-of-interest has a first value and a region other than the region-of-interest has a second value. Based on the value of the binary image, the region-of-interest is projected. Thus, the image processing is performed at high speed. In addition, since the region-of-interest is shaded on the basis of the value of the gray-level image, a high-quality surface display image can be formed.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

A first embodiment of the image processing apparatus of the present invention will now be described with reference to the accompanying drawings. In the system of the first embodiment, modeling and rendering are performed on the basis of raw data input from a medical image diagnosis device, and a surface display image is formed and displayed.

Figure 1:
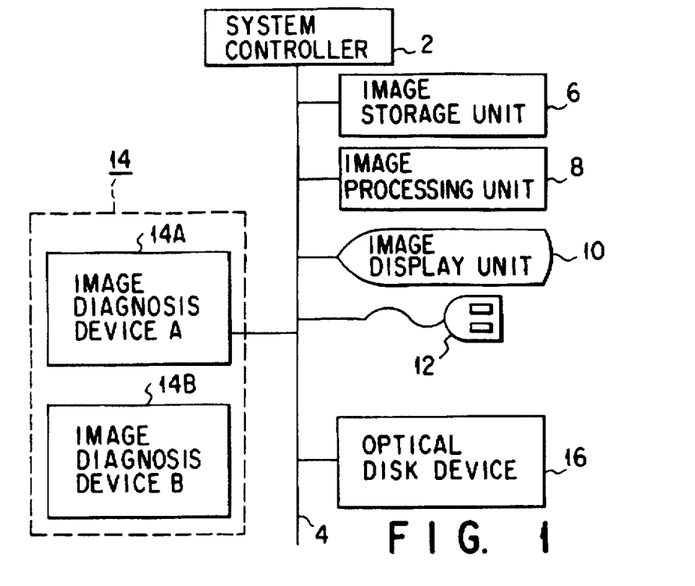
FIG. 1 is a block diagram showing the structure of an image processing apparatus according to a first embodiment of the present invention.

FIG. 1 is a block diagram showing the structure of an image processing apparatus according to the first embodiment of the present invention. The system of the first embodiment comprises a system controller 2 for controlling the entire system, an image storage unit 6 for storing various image data, an image processing unit 8 for performing modeling, rendering, etc. for the formation of a surface display image, an image display unit 10 for displaying the surface display image, a mouse 12 serving as an input unit for an operator to input various instructions to the system, an image diagnosis device 14, and an optical disk device 16.

The image diagnosis device 14 comprises an image diagnosis device 14A and an image diagnosis device 14B. The image diagnosis device 14 is on-line connected to the system via a system bus 4. For example, the image diagnosis device 14A is a magnetic resonance imaging apparatus (MRI apparatus), and the image diagnosis device 14B is a computed tomography apparatus (CT apparatus). The image diagnosis devices 14A and 14B perform 3D imaging to obtain a plurality of tomograms of one object at an equal slicing distance and deliver raw data to the image storage unit 6. These devices 14A and 14B may be another modality, e.g. a single photon emission CT apparatus (SPECT).

The optical disk device 16 is a secondary storage device for storing raw data. In the present system, raw data can be taken in from the image diagnosis device 14 in an on-line mode, or raw data can be taken in from the secondary storage device such as optical disk device 16 in an off-line mode. The optical disk device 16 may be another type of secondary storage device such as a hard disk drive (HDD).

Figure 2:
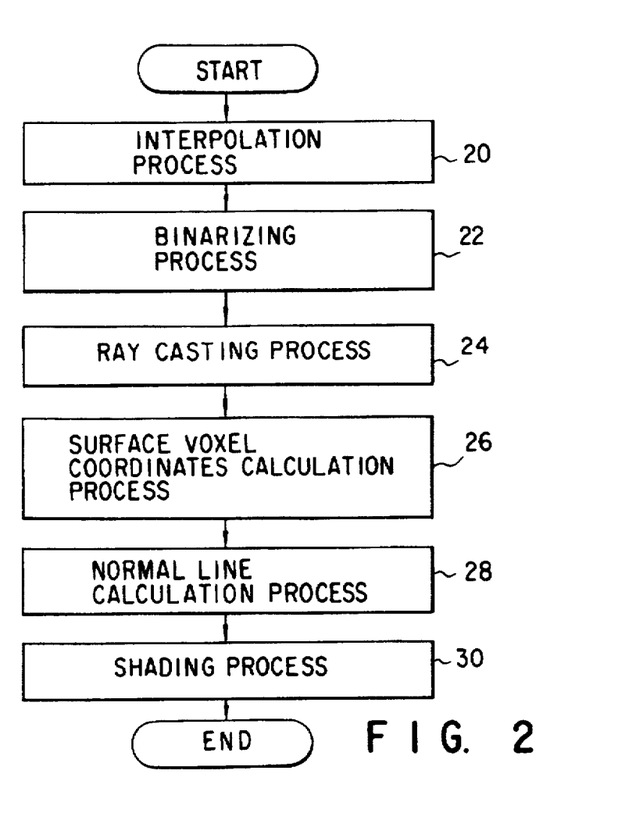
FIG. 2 is a flow chart illustrating the operation of an image processing unit 8 for forming a surface display image in the first embodiment.

The operation of the above system of the first embodiment will now be described. FIG. 2 is a flow chart illustrating the operation of the image processing unit 8 for forming a surface display image in the first embodiment.

The surface display image is formed by a modeling process including an interpolation process 20 and a binarizing process 22, and a rendering process including a ray-casting process 24, a surface voxel coordinates calculation process 26, a normal line calculation process 28 and a shading process 30. At first, the modeling process is carried out.

Figure 3:
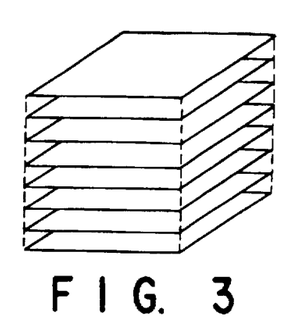
FIG. 3 schematically shows a plurality of tomograms.
Figure 4:
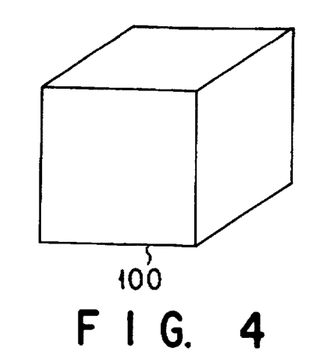
FIG. 4 schematically shows gray-level volume data.

In the interpolation process 20, raw data included in a plurality of tomograms obtained at an equal slicing distance are input from the image diagnosis device 14A or 14B or optical disk device 16 and data of intermediate slices are interpolated based on the raw data of the tomogram slices, thereby forming gray-level volume data consisting of voxels with gray-level values. FIG. 3 schematically shows the a plurality of tomograms, and FIG. 4 schematically shows the gray-level volume data 100.

If the pitch of the slice between the interpolated slice and the tomogram slice is the same as the pixel pitch in the tomogram, data intervals of voxels of gray-level volume data 100 are equal in X-, Y- and Z-directions. The image storage unit 6 stores the formed gray-level volume data 100.

Figure 5:
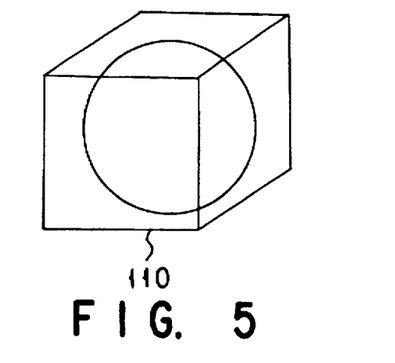
FIG. 5 schematically shows binary volume data.

Then, in the binarizing process 22, the gray-level volume data 100 is read out from the image storage unit 6. The read-out gray-level volume data 100 is converted to binary volume data, with a predetermined threshold used. Thus, binary volume data is obtained. Thereby, an object to be surface-displayed is extracted as a region-of-interest (ROI). FIG. 5 schematically shows the binary volume data 110. A spherical region shown in FIG. 5 is the ROI. The threshold value is preset at a value at which a voxel value of the ROI can be distinguished from that of the other region. The binarizing process is performed such that a first value, e.g. "1" is assigned to the voxel value of the ROI and a second value, e.g. "0" is assigned to the voxel value of the other region on the basis of the preset threshold value.

The ROI can be extracted not only by the binarizing process based on the threshold, but also by other conventional ROI extraction methods such as the regions coupling method.

The binary volume data 110 is stored in the image storage unit 6.

The modeling process is thus completed, and the rendering process is initiated.

Figure 6:
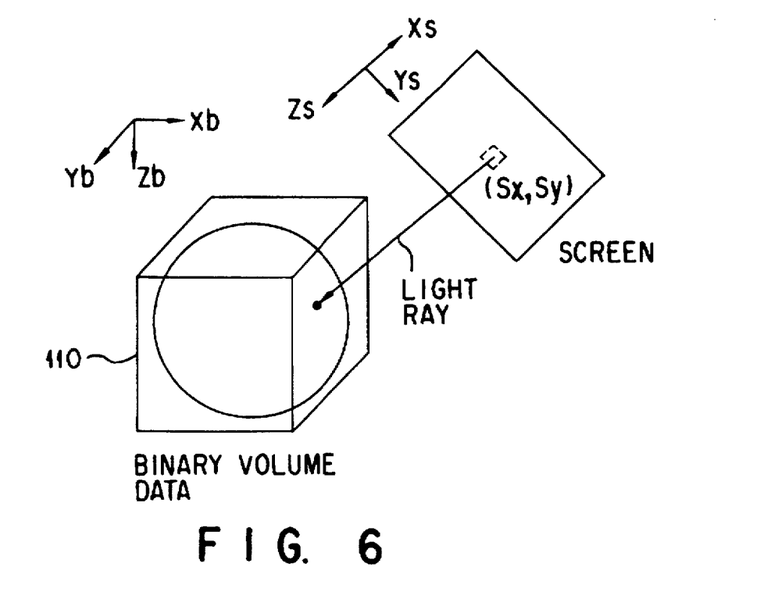
FIG. 6 schematically shows the relationship between binary volume data and a depth image.

In the ray-casting process 24, the binary volume data 110 is read out from the image storage unit 6, and a projection plane is set for the binary volume data 110 in accordance with a predetermined viewing direction. Thus, a depth image is formed. Specifically, a projection plane constituted by a screen consisting of pixels with directional components of Xs and Ys is set. A light ray is vertically emitted from each pixel (Sx, Sy) of the set projection plane to the binary volume data 110. The length D (Sx, Sy) (i.e. the distance between the projection plane and the surface of the ROI) of the light ray between the pixel and the voxel with value "1"(i.e. the voxel on the surface of the ROI) is found, and a matrix [Sx Sy D(Sx, Sy)] representing a depth image defined by the length D (Sx, Sy) of the light ray at each pixel (Sx, Sy) is formed. FIG. 6 schematically shows the relationship between the binary volume data 110 and depth image.

Subsequently, in the surface voxel coordinates calculation process 26, the values of coordinates [Bx, By, Bz] of the surface voxel are calculated according to equation (1) below, on the basis of the depth image D (Sx, Sy) and the transform matrix T from the screen coordinates system (Xs, Ys, Zs) to the gray-level volume data coordinates system (Xb, Yb, Zb).

$$[BxByBz] = T[SxSyD(Sx,Sy)] \quad (1)$$

The binary volume data 110 or gray-level volume data 100 may be subjected to a reduction/enlargement process, so that the magnification and the matrix size of each volume data item are altered. As a result, the binary volume data coordinates system may differ from the gray-level volume data coordinates system. In this case, coordinate transformation must be performed between both volume data coordinates systems. Specifically, the values of coordinates [Bx' By' Bz'] of the surface voxel in the binary volume data coordinates system are at first calculated according to equation (2) below, on the basis of the depth image [Sx Sy D (Sx, Sy)] and the transform matrix T' from the screen coordinates system to the binary volume data coordinates system. Then, the values of coordinates [Bx By Bz] of the surface voxel in the gray-level volume data coordinates system are calculated according to equation (3) below, on the basis of the values of coordinates [Bx' By' Bz'] of the surface voxel in the binary volume data coordinates system and the transform matrix T" from the binary volume data coordinates system to the gray-level volume data coordinates system.

$$[Bx'By'Bz'] = T'[SxSyD(Sx,Sy)] \quad (2)$$

$$[BxByBz] = T''[Bx'By'Bz'] \quad (3)$$

In the normal line calculation process 28, a plurality of normal lines of surface voxels (surface normals) are calculated from the values of coordinates (Bx, By, Bz) of the surface voxels in the gray-level volume data 100 with reference to voxel values of adjacent voxels near the surface voxel, g (Bx+1, By, Bz), g (Bx−1, By, Bz), g (Bx, By+1, Bz), g (Bx, By−1, Bz), g (Bx, By, Bz+1) and g (Bx, By, Bz−1). A normal line N of the surface voxel is given by equation (4):

$$\vec{N} = (Gx, Gy, Gz) \quad (4)$$

wherein $$Gx = g(Bx+1,By,Bz) - g(Bx-1,By,Bz) \quad (5)$$

$$Gy = g(Bx,By+1,Bz) - g(Bx,By-1,Bz) \quad (6)$$

$$Gz = g(Bx,By,Bz+1) - g(Bx,By,Bz-1) \quad (7)$$

Figure 7:
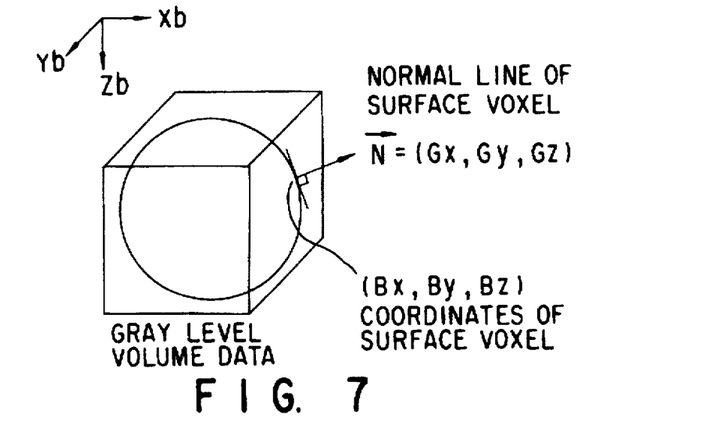
FIG. 7 schematically shows the relationship between gray-level volume data and a normal line of a surface voxel.

FIG. 7 schematically shows the relationship between gray-level volume data 100 and the normal line of the surface voxel.

The shading process 30 is performed on the basis of surface normals(normel line N of the surface voxel) obtained in the normal line calculation process 28 and the depth image [Sx, Sy, D (Sx, Sy)] obtained in the ray-casting process 24. Thus, a surface display image is formed. In the shading process, the shading is performed such that the object surface becomes darker as the distance between the projection plane and the object surface increases in accordance with the depth image, and the object surface becomes lighter as the distance decreases. In addition, the shading is performed such that the object surface becomes lighter as the parallelism of the normal line of the surface voxel to the direction of a predetermined line of view (i.e. direction vertical to the projection plane) increases and the object surface becomes darker as the perpendicularity of the normal line of the surface voxel to the direction of the predetermined line of sight increases.

Thus, the rendering process is completed, and the image display unit 10 displays the formed surface display image.

In the above-described process of forming the surface display image, the ray-casting process is time-consuming. In the present embodiment, the ray-casting process is not performed for the gray-level volume data 100, which is large in amount, but for the binary volume data 110 which is relatively small in amount, thereby obtaining the depth image. Thus, high-speed processing can be carried out. In addition, on the basis of the obtained depth image, the values of coordinates of the surface voxels in the gray-level volume data 100 are calculated, and surface normals are found with reference to the gray-level voxel values of the gray-level volume data 100.

Thus, the shading process is carried out. Therefore, a high-quality surface display image can be formed.

A modification of the first embodiment will be described. When the surface display image is applied to the computer-simulated surgery, a specified 3D region of the object to be displayed is drilled in some cases, or the object is cut in a specified cut plane. These modifications are considered important in the computer-simulation of surgery.

Figure 8:
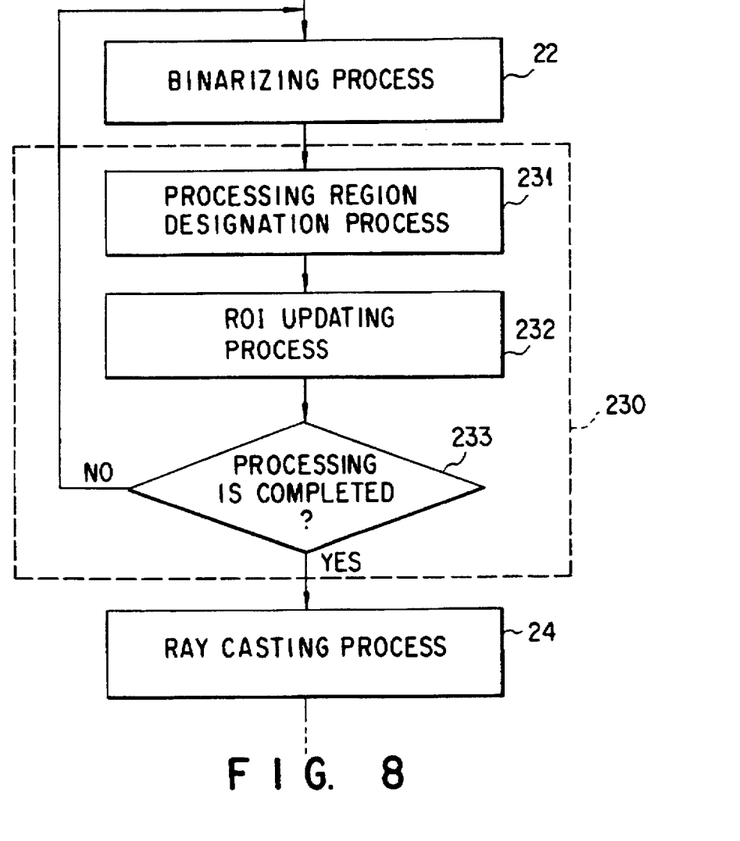
FIG. 8 is a flow chart illustrating the detail of a modifying process.

When the image processing apparatus of this embodiment is applied to the computer-simulated surgery, the ROI of the binary volume data 110 obtained by the above binarizing process is subjected to the modifying process including at least drilling and cutting. FIG. 8 is a flow chart illustrating in detail a modifying process 230.

Figures 9, 10:
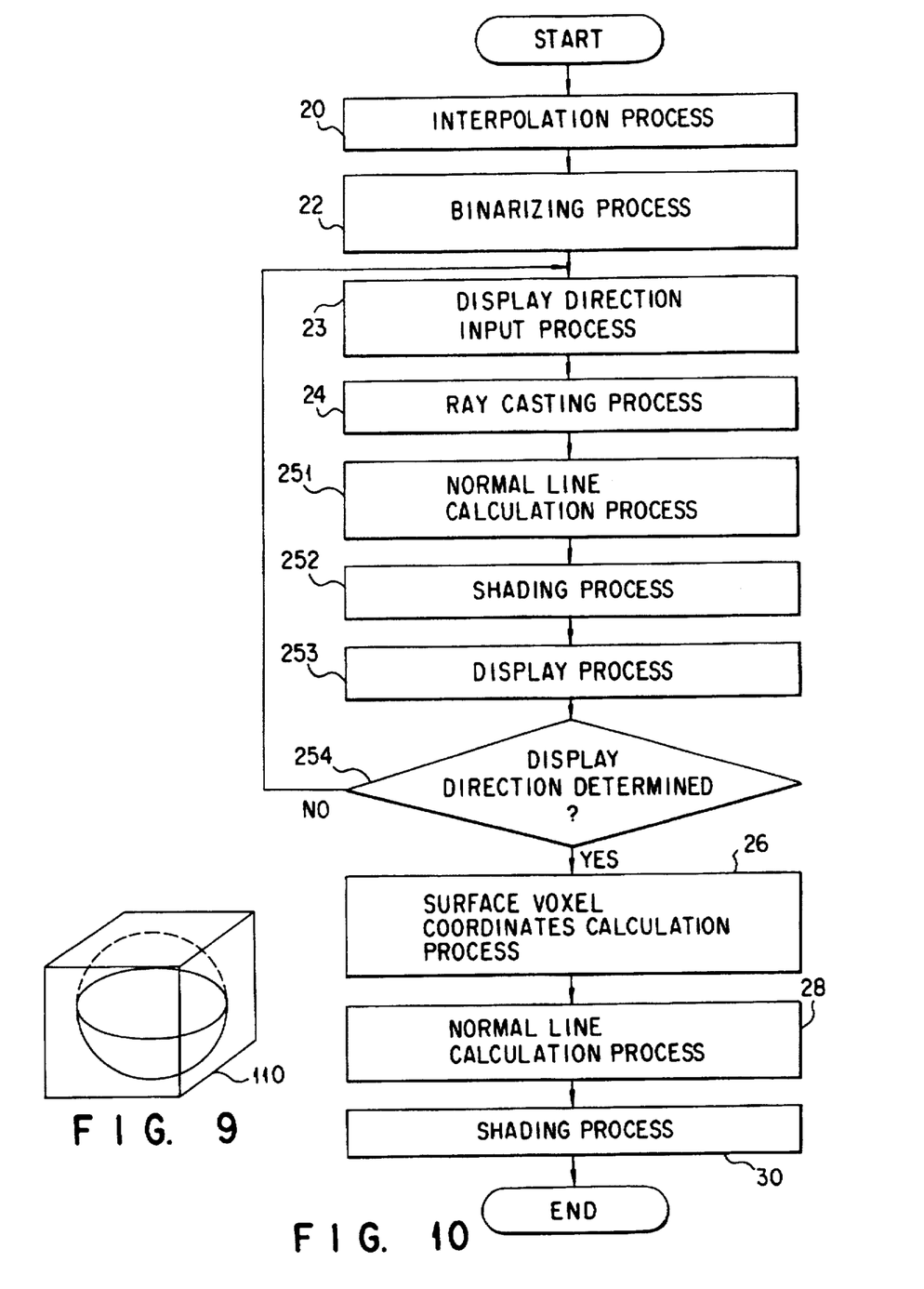
FIG. 9 schematically shows a region-of-interest (ROI) of processed binary volume data.
FIG. 10 is a flow chart illustrating the operation of an image processing apparatus according to a second embodiment of the invention.

The modifying process 230 comprises a modifying region designation process 231, an ROI updating process 232 and a modifying completion determination process 233. In the modifying region designation process 231, a desired 3D region or a modifying region for cross-sectional cutting, etc. is designated on the surface display image displayed on the image display unit 10. In the ROI updating process 232, the voxel value of modifying region in the ROI of the binary volume data 110 is updated from "1" to "0"(or "0" to "1" in the case of releasing the designation). FIG. 9 schematically shows the updated ROI in the modified binary volume data 110.

In the subsequent modifying completion determination process 233, it is determined whether the operator instructs the completion of modifying. If it is not, the modifying is performed once again. Thus, the operator can repeat the modifying until a desired result is attained.

If the completion of the modifying is detected in the determination process 233, the processing of the ray-casting process 24 and the subsequent processing are executed. In these processes, the ROI updated by the ROI updating process 232 is used.

In the present modification of the first embodiment, not the ROI of the gray-level volume data 100, which is large in amount, but the ROI of the binary volume data 110, which is relatively small in amount, is updated. Thus, the high-speed processing can be performed and the high-accuracy surface display image can be obtained. Therefore, the computer-simulated surgery can be performed more effectively.

A second embodiment of the image processing apparatus according to the invention will now be described with reference to FIG. 10. In the description of the second embodiment, the same structural elements as those of the first embodiment are denoted by like reference numerals and a detailed description thereof is omitted.

In the second embodiment, the object to be displayed is surface-displayed while the direction of display of the object is altered in real time in accordance with the operator's instructions input by the mouse 12, etc.

The interpolation process 20 and binarizing process 22 are the same as those of the first embodiment.

In a display direction input process 23, the direction of display (viewing direction) is input from the mouse 12. For example, a 3D cursor representing the direction of display is displayed on the image display unit 10, and the cursor is controlled by the input from the mouse 12.

The subsequent ray-casting process 24 is similar to that of the first embodiment. In this process 24, however, the display direction is not predetermined or fixed as in the first embodiment but can be varied or freely designated. The projection plane is set to the binary volume data 110 in the display direction input in the display direction input process 23 and a depth image is formed.

Thereafter, in a normal line calculation process 251, surface normals are calculated on the basis of only the formed depth image. In a shading process 252, a shading process is performed on the basis of the calculated surface normals and a surface display image is formed. In a display process 253, the formed surface display image is displayed on the image display unit 10.

The surface display image formed in the normal line calculation process 251 through the shading process 253 is shaded on the basis of only the depth image. This shading method is the same as the conventional Z-buffer gradient shading method. Although the image quality is rough, the surface display image can be formed at high speed.

In a display direction determination process 254 for determining whether or not the display direction has been determined on the basis of the state of depression of the mouse button, it is determined that the display direction has not been determined, while the mouse button is being dragged. When the mouse button has been released, it is determined that the display direction has been determined.

The operator releases the mouse button when the object as viewed in a desired direction has been displayed, while referring to the surface display image the display direction of which is altered in real time. Thereby, the display direction is determined and the process advances to a surface voxel coordinates calculation process 26. The process 26 and the subsequent processes are the same as those of the first embodiment. A surface display image is formed on the basis of a depth image obtained by the ray-casting in the desired display direction and surface normals obtained with use of the surface voxel values of gray-level volume data 100.

According to the above-described embodiment, while the display direction is being altered (i.e. while the mouse is being dragged), surface normals are calculated from the depth image on the basis of the screen coordinates system and the shaded image is obtained on the basis of surface normals and displayed (the display direction input process 23 through the display process 253). When the display direction has been determined (i.e. when the mouse button has been released) ("YES" in the display direction determination process 254), surface normals are calculated from the object surface voxel value and the voxel value in the vicinity on the basis of the gray-level volume data coordinates system. Based on these surface normals, the shaded image is formed and displayed (the surface voxel coordinates calculation process 26 through the shading process 30). Thus, the display direction of the display object is altered in real time and quickly determined, and then the high-quality surface display image can be displayed. Thereby, the operability is enhanced and the load on the operator is reduced.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, in the embodiments, the depth image is obtained by the ray-casting method. However, other methods (Z-buffer method, back-to-front method, etc.). Furthermore, in the embodiments, the medical image is treated. However, other kinds of images can be treated.

What is claimed is:

1. An image processing apparatus comprising:

conversion means for converting a three-dimensional gray-level image to a three-dimensional binary image in which a region-of-interest has a first value and a region other than the region-of-interest has a second value;

projection means for projecting the region-of-interest of the three-dimensional binary image obtained by said conversion means on a screen to obtain a depth image, said depth image representing a length from said screen to surface voxels of the region-of-interest of the three-dimensional binary image;

real-time shading means for shading using said depth image in real time and for forming a real-time surface display image;

first calculation means for calculating positions of surface voxels of the three-dimensional gray-level image on the basis of the depth image obtained by said projection means;

second calculation means for calculating surface normals at said positions of surface voxels of the three-dimensional gray-level image; and first shading means for shading said surface voxels of the three-dimensional gray-level image according to the surface normals obtained by said second calculation means, thus forming a first surface display image.

2. The image processing apparatus according to claim 1, further comprising modifying means for modifying the region-of-interest of the three-dimensional binary image obtained by said conversion means, and wherein said projection means projects the region-of-interest of the three-dimensional binary image modified by said modifying means.

3. The image processing apparatus according to claim 2, wherein said modifying means comprises:

designation means for designating a modifying region; and updating means for updating the region-of-interest of the three-dimensional binary image on the basis of the modifying region designated by said designation means.

4. The image processing apparatus according to claim 1, further comprising:

changing means for changing magnification of said three-dimensional gray-level image and the three-dimensional binary image obtained by said conversion means.

5. The image processing apparatus according to claim 4, wherein said first calculation means comprises:

position calculation means for calculating positions of surface voxels of the three-dimensional binary image on the basis of the depth image obtained by said projection means; and position conversion means for converting the positions of surface voxels of the three-dimensional binary image calculated by said position calculation means to the positions of surface voxels of the three-dimensional gray-level image according to the magnification changed by said changing means.

6. An image processing apparatus comprising:

conversion means for converting a three-dimensional gray-level image to a three-dimensional binary image in which a region-of-interest has a first value and a region other than the region-of-interest has a second value;

storage means for storing the three-dimensional binary image obtained by said conversion means;

projection means for projecting the region-of-interest of the three-dimensional binary image stored in said storage means on a screen along a projection direction to obtain a depth image, said depth image representing a length from said screen to surface voxels of the region-of-interest of the three-dimensional binary image;

first shading means of shading the surface voxels of the three-dimensional binary image obtained by said conversion means according to the depth image obtained by said projection means, thus forming a first surface display image;

first calculation means for calculating positions of surface voxels of the three-dimensional gray-level image on the basis of the depth image used by said first shading means;

second calculation means for calculating surface normals at said positions of surface voxels of the three-dimensional gray-level image;

second shading means for shading said surface voxels of the three-dimensional gray-level image according to the surface normals obtained by said second calculation means, thus forming a second surface display image;

changing means for changing the projection direction of said projection means to determine an optimum display direction, thus causing said projection means for perform re-projection; and display means for displaying the first surface display image formed by said first shading means while said changing means is activated and displaying the second surface display image upon completion of change of the display direction.

7. The image processing apparatus according to claim 6, further comprising:

a mouse which has a button; and control means for controlling said changing means to change said projection direction while said button is dragged.

8. An image processing apparatus as recited in claim 6, wherein said projection means performs said reprojecting while said changing means changes said direction.

9. A method for forming a surface display image comprising the following steps of:

converting a three-dimensional gray-level image to a three-dimensional binary image in which a region-of-interest has a first value and a region other than the region-of-interest has a second value;

designating a display direction of the surface display image to determine an optimum display direction;

projecting a region-of-interest of the binary image on a screen in the display direction designated by said designating step to obtain a depth image indicative of a distance between the screen and the region-of-interest;

forming a first surface display image by performing shading process on the basis of the depth image;

displaying the first surface display image; and determining whether or not the optimum display direction is determined, executing the designating step again if the optimum display direction has not been determined, and if the optimum display direction has been determined, forming a second surface display image by performing shading process on the basis of the gray-level image and displaying the second surface image.

10. A method of producing a surface image, comprising:

generating a gray-level image using gray-level volume data of a portion of an object;

selecting a surface region-of-interest in said volume data;

generating a binary image where said region-of-interest has a first value and a region other than the region-of-interest has a second value;

forming a depth image by projecting said region-of-interest along a projection direction using volume data corresponding substantially only to said surface region-of-interest;

shading using said depth image to form a first surface display image;

determining positions of surface voxels of said gray-level image using said depth image;

determining surface normals at said positions;

changing said projection direction to determine an optimal display direction;

reprojecting said region-of-interest; and shading using said positions and surface normals to form a second surface display image.

11. A method as recited in claim 10, wherein said selecting step comprises:

determining a voxel threshold value; and using said voxel threshold value to produce binary volume data corresponding substantially only to said surface region of interest.

12. A method as recited in claim 11, wherein forming said depth image comprises:

ray-casting using said binary volume data.

13. A method as recited in claim 10, wherein performing said shading using said positions and surface normals comprises:

calculating surface voxel coordinates;

calculating normal lines using said surface voxel coordinates; and shading using surface normals based upon said normal lines.

14. A method as recited in claim 10, comprising:

modifying said surface region of interest.

15. A method as recited in claim 14, wherein modifying said surface region comprises:

designating a region in said surface region-of-interest;

modifying values of voxels in said region.

16. A method as recited in claim 10, comprising:

changing a magnification of at least one of said volume data and said volume data corresponding substantially only to said surface region-of-interest;

performing a coordinates transformation between coordinates of said volume data and coordinates of said volume data corresponding substantially only to said surface region-of-interest.

17. A method as recited in claim 10, comprising:

reprojecting said region-of-interest while said projection direction is being changed.

* * * * *